United States Patent [19]

Ishihara et al.

[11] 4,183,656
[45] Jan. 15, 1980

[54] SLIT EXPOSURE TYPE COPYING APPARATUS

[75] Inventors: Toshiaki Ishihara, Toyokawa; Fumitoshi Atsumi, Shizuoka; Tetsuya Yamada, Aichi, all of Japan

[73] Assignee: Minolta Camera Kabushiki Kaisha, Osaka, Japan

[21] Appl. No.: 902,710

[22] Filed: May 4, 1978

[30] Foreign Application Priority Data

May 13, 1977 [JP] Japan .............................. 52/55893
Aug. 15, 1977 [JP] Japan .............................. 52/97951
Aug. 16, 1977 [JP] Japan .............................. 52/98532

[51] Int. Cl.² .......................................... G03G 15/28
[52] U.S. Cl. ........................................ 355/8; 355/30
[58] Field of Search ................... 355/8, 30, 11, 3 R, 355/13

[56] References Cited

U.S. PATENT DOCUMENTS

| | | | |
|---|---|---|---|
| 3,689,141 | 9/1972 | Gray | 355/8 X |
| 3,950,090 | 4/1976 | Washio et al. | 355/8 |
| 4,007,986 | 2/1977 | Komori et al. | 355/8 X |

Primary Examiner—R. L. Moses
Attorney, Agent, or Firm—Watson, Cole, Grindle & Watson

[57] ABSTRACT

The operation of a slit exposure type copying apparatus is controlled to avoid overheating of a transparent cover for the original supporting station by controlling either, or both, of the excitation of the exposure lamp and the return movement of the movable scanning of the original. A detector switch is mounted in the path of movement of the scanning mechanism and is actuated thereby to deenergize the exposure lamp means when the scanning mechanism has travelled a distance substantially equal to that distance required to scan the original. A minimum distance of travel for the scanning means is defined and includes at least one second detector switch which is exposed in the path of movement of the scanning mechanism and is actuatable thereby to return the scanned mechanism to its initial position. The scanning means is caused to move until the actuation of the second detector switch if the first detector switch is actuated prior thereto, or to continue movement when the second detector switch is actuated prior to the first detector switch.

12 Claims, 27 Drawing Figures

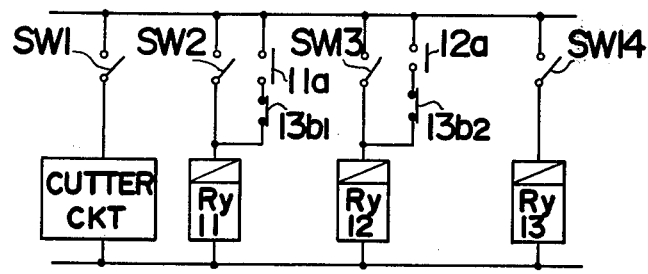
FIG.23
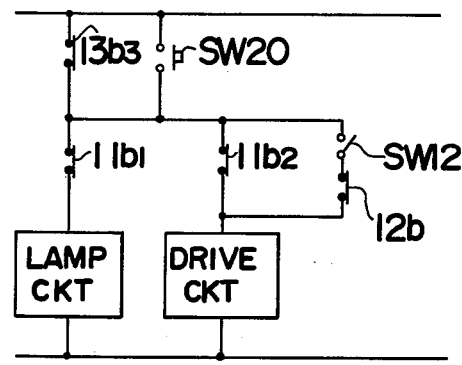
FIG.24A
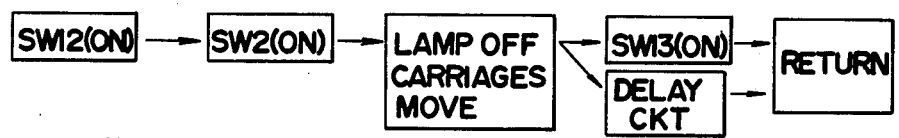
FIG.24B
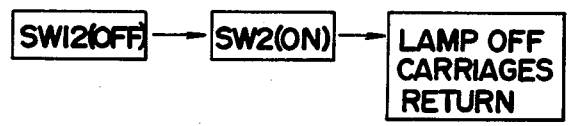
FIG.25
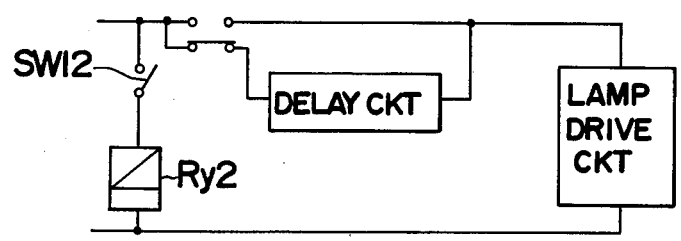

SLIT EXPOSURE TYPE COPYING APPARATUS

FIELD OF THE INVENTION

This invention relates to a slit exposure type copying apparatus, and more particularly to a slit exposure type copying apparatus with reciprocatingly movable scanning means in which the surface of an original holder supporting the original document to be copied is adapted for repeated exposure without entailing an abnormal rise of temperature due to the repetition of exposure.

BACKGROUND OF THE INVENTION

Generally slit exposure type copying apparatus comprise an original holder of glass or like transparent plate for supporting an original document thereon and an exposure lamp for illuminating the original from below the holder. The original holder or optical system including the exposure lamp is movable to successively scan the original, and the scanned images are projected onto the surface of a photosensitive member to form on the photosensitive surface thereof electrostatic latent images corresponding to the images of the original.

The exposure lamp used in such copying apparatus of the slit exposure type is very bright and therefore releases a large quantity of heat rays, consequently subjecting the original holder, especially the surface of the original supporting glass plate, to an increased temperature. The rise of temperature becomes more pronounced when the exposure lamp is a halogen lamp. Further, when the scanning means is so adapted that the original holder or the optical system is movable over varying distances in accordance with the length of the original, the temperature rises with a decrease in the distance of the scanning movement.

PRIOR ART

U.S. Pat. No. Re. 27,700 discloses a copying apparatus in which the distance of travel of the scanning means is variable with the length of the original to be copied. With such copying apparatus, the copying paper accommodated therein is in the form of a roll and is paid out and cut by a random cutting mechanism to a length equal to the length of the original to be copied. The cutting mechanism comprises a cutter, an index member slidable along one side of an original supporting glass plate to be positioned at one end of the original, a switch movable with the index member, and a cam having a cutout and rotatable with copying operation, such that when an actuating member for the switch comes into engagement with the cutout, the cutter is operated to cut the copying paper to the length of the original. The images of the original are scanned by the travel of an optical system including an exposure lamp and serving as a scanning means. The index member is integral with switch means extending into the path of travel of the scanning means. The scanning means, when actuating the switch means during its scanning movement, immediately stops and returns. Thus the distance of travel of the scanning means is variable with the length of the original to be copied to ensure a rapid copying operation.

However, the copying apparatus described involves the problem that when an original of small length is copied repetitively, namely when the travel distance of the scanning means is short, the temperature of the original supporting glass plate rises to an abnormal level. For instance, when an original smaller than, or equal to, A5 size (148 mm×210 mm) is repeatedly copied a number of times with use of scanning means which is returnable in the foregoing manner, the scanning means is returned to its start position within a very short time after the extinction of the exposure lamp upon completion of scanning, and is immediately brought into the next exposure-scanning operation, thus giving little or no time for the cooling of the exposure lamp and entailing a great increase in the temperature of the original supporting glass plate. When the scanning means is adapted to be returned by the restoring force of a spring which is compressed or tensioned by the forward scanning movement, the scanning means returns at a very high speed, posing a serious problem when producing a number of copies in succession.

To prevent the rise in the temperature of the original holder, it has been attempted to interpose a heat ray absorbing glass plate between the exposure lamp and the glass, or to provide means for applying cooling air to the holder. However, it is noted that as the heat absorbing efficiency of heat ray absorbing glass increases, the heat insulating effect achieved improves but the amount of light useful for exposure decreases, thus entailing the necessity of, for example, applying a higher input voltage to the exposure lamp to obtain the specified amount of light. This will adversely affect the life of the exposure lamp. Additionally, an inexpensive glass plate of low absorbing efficiency, if used, would produce a very poor heat insulating effect. The method of cooling the original supporting glass plate with air requires additional means such as a fan and duct and, nevertheless, gives a much lower cooling effect than is desired.

SUMMARY OF THE INVENTION

In an attempt to suppress a rise in the temperature of the original supporting glass plate, the inventors conducted an experiment in which the time interval between each two successive copies, namely the duration of the extinction of the exposure lamp, was altered to check the original supporting glass plate for the temperature increase resulting from a continual copying operation. The results are given in the graph of FIG. 1. Two halogen lamps (80 V, 350 W) were used for exposure. It has been found that when an original of A5 size is continually copied, the temperature of the glass plate will be raised to saturation in about one hour. Thus the saturation temperature of the original supporting glass plate plotted as the ordinate refers to the temperature of the glass plate resulting from a one-hour continual copying operation. The time interval between successive copying cycles, namely the duration of extinction of the exposure lamps, is plotted as the abscissa. However, the duration does not include the time required for the return of the scanning system during which the exposure lamps are not energized. The actual duration of the extinction of the exposure lamps should therefore be interpreted as the sum of the plotted time and about one second required for the return.

The results of the experiment reveal that when an original smaller than, or equal to, A5 size is continually copied, the rise in the temperature of the glass plate can be suppressed if a copying cycle is repeated at least one second after the lamps, lighted for making the preceding copy, have been turned off. Stated more specifically, the rise in the temperature of the glass plate can be limited to about 55° C. when the copying operation is repeated at a time interval (i.e. duration of extinction of the exposure lamps) of at least one second.

The main object of the present invention is to provide a slit exposure type electrophotographic copying apparatus free of the foregoing drawbacks.

Another object of the present invention is to provide a slit exposure type copying apparatus with reciprocatingly movable scanning means adapted for a continual copying operation without entailing an abnormal rise in the temperature of the original supporting glass plate.

Still another object of the present invention is to provide a slit exposure type copying apparatus which is adapted for an efficient copying operation and in which the rise in the temperature of the original supporting glass plate is suppressed.

In a slit exposure type copying apparatus in which scanning means is movable a variable distance for scanning, the foregoing and other objects of the present invention can be fulfilled by setting a specified minimum distance for the scanning movement of the scanning means and causing the scanning means to move the specified minimum distance even when scanning can be completed by a scanning movement over a shorter distance than the specified minimum distance to make copies of a substantially reproducible original of the shortest length.

The objects of this invention can be fulfilled by another embodiment of the invention which includes speed reduction means acting on the return means for returning the scanning means to its scanning initiating position after an exposure lamp has been turned off upon completion of scanning so that the time taken for the return of the scanning means is extended to a predetermined period of time or longer.

The objects of the present invention are fulfilled by another embodiment thereof in which when the distance of the scanning movement of the scanning means is shorter than a specified distance, the exposure lamp is held turned off for a predetermined period of time, namely the scanning means is initiated into a return movement with delayed timing after the exposure lamp has been turned off, or the scanning means after being returned to its start position is held out of copying operation for a predetermined period of time.

For a fuller understanding of the nature and objects of the present invention, reference is made to the following detailed description taken in conjunction with the accompanying drawings which illustrate preferred embodiments of the present invention and in which like parts are designated by like reference numerals.

BRIEF DESCRIPTION OF THE DRAWINGS

FIG. 23 is an electric circuit for the control means illustrated in FIGS. 21 and 22;

FIGS. 24A and 24B are block diagrams each showing an operational sequence of the circuit of FIG. 23; and FIG. 25 is an electric circuit according to another embodiment.

DESCRIPTION OF THE PREFERRED EMBODIMENTS

Figure 1:
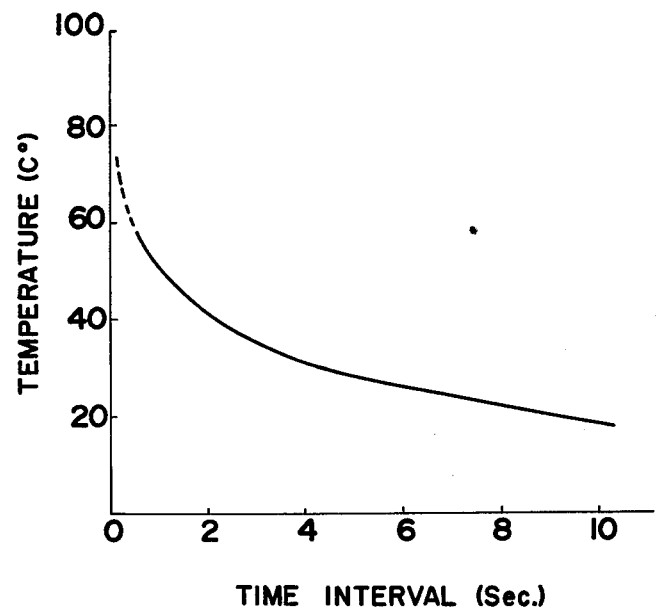
FIG. 1 is a graph showing the relation between the saturation temperature of an original supporting glass plate and the duration of the extinction of exposure lamps during a continual copying operation.
Figure 2:
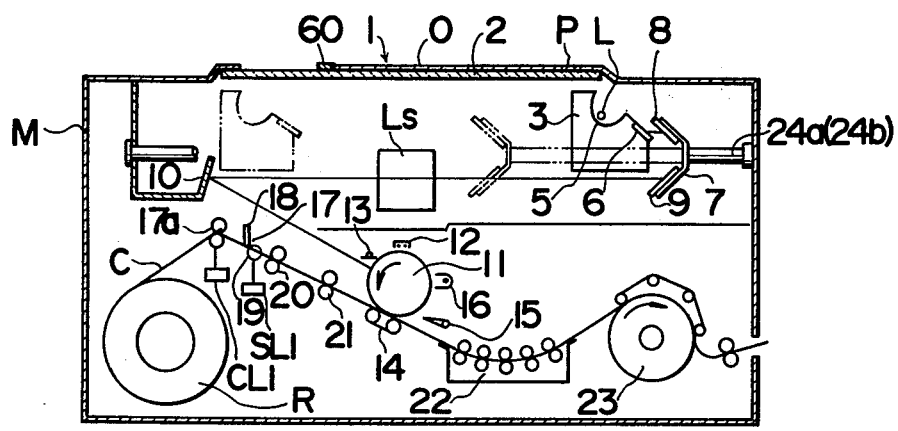
FIG. 2 is an overall medial longitudinal cross-sectional view showing a slit exposure type copying apparatus according to this invention.

FIG. 2 shows a slit exposure type copying apparatus M embodying the present invention. Copying apparatus M includes original holder 1 having transparent glass plate 2 for supporting thereon original document O to be copied. Disposed below original holder 1 is an optical scanning means comprising first movable carriage 3 including exposure lamp 4 and first mirror 6 which are supported by reflector 5, second movable carriage 7 including second and third mirrors 8 and 9, projection lens L, and stationary mirror 10. The scanning means projects the images of scanned original O onto rotatable photosensitive member 11. As will be apparent from the description to be given later, first carriage 3 is movable parallel to original O at twice the speed of second carriage 7 so as to maintain the path of light from original O to photosensitive member 11 at a constant length at all times, whereby light is projected onto photosensitive member 11 through lens Ls and stationary mirror 10 to form electrostatic latent images on photosensitive member 11.

Provided around the photosensitive member 11 and arranged in the direction of rotation thereof are corona discharge means 12 for uniformly charging the photosensitive member 11, exposure slit 13 for passing the images to be projected onto photosensitive member 11, transfer means 14 for transferring the electrostatic latent images onto copying paper C, separator 15 for separating the copying paper from the photosensitive surface of photosensitive member 11, and eraser 16 for removing residual charges from the photosensitive surface.

Copying paper C is in the form of roll R. The paid-out portion of paper C is nipped between a pair of feed rollers 17a coupled to paper feed clutch CL1 and adapted to be intermittently driven. The leading end of paper C is positioned where cutter 17 is located. Cutter 17 is coupled to solenoid SL1 and has rotary blade 19 and stationary blade 18. The leading end of paper C in this position is sent toward transfer means 14 by pairs of transport rollers 20 and 21. After the electrostatic latent images have been transferred to the paper, the paper is peeled off photosensitive member 11 by separator 15, then subjected to development by developing means 22, thereafter passed over fixing means 23 and withdrawn from the apparatus.

Figure 3:
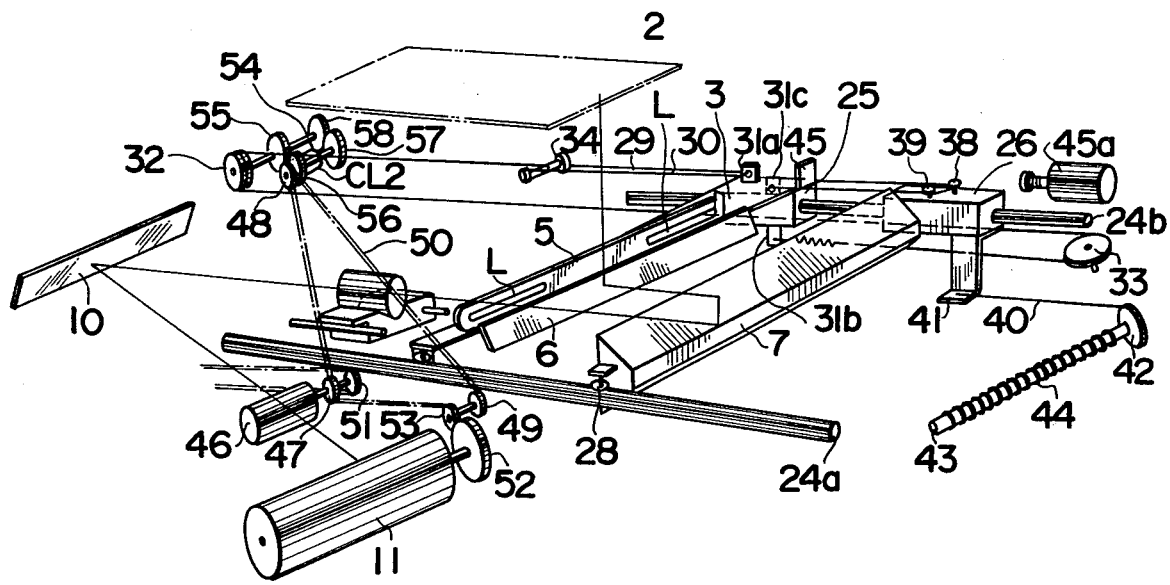
FIG. 3 is a detailed perspective view of the copying apparatus shown in FIG. 2.

The optical scanning means is driven by the mechanism shown in detail in FIG. 3. First carriage 3 and second carriage 7 are provided at their opposite ends with sliding members 25, 26 and bearings 27, 28 by which the carriages are supported on a pair of guide rails 24a, 24b to be movable parallel to original holder 1. First and second carriages 3 and 7 are movable for scanning by first cable 29 and second cable 30, respectively, in a speed ratio of 1:½. First cable 29 has one end secured to holding member 31a on sliding member 25 of first carriage 3 and is passed around drive pulley 32, then extends straight, is further passed around guide pulley 33 and terminates in the other end which is fixedly held to another holding member 31b on the bottom of first carriage 3. Second cable 30 has one end secured to adjustable knob member 34 and is reeved around pulley 38 and another pulley 39 which are fixedly mounted on sliding member 26 of second carriage 7. The other end of second cable 30 is secured to holding member 31c on sliding member 25 of first carriage 3.

The drive mechanism shown in FIG. 3 further includes third cable 40 having one end secured to holding member 41 on sliding member 26 and the other end fixedly engaged with return pulley 32 integral with one end of rod 43 having return spring 44. First and second carriages 3 and 7 are returned by the action of return spring 44 on completion of their scanning movement. While returning, the carriages are brought to a halt by the contact of plate 45 with bumper 45a. Plate 45 is provided on sliding member 25 on first carriage 3.

Main motor 46 for driving first and second carriages 3 and 7 for scanning is coupled to first pulley 47. Timing belt 50 is reeved in an endless fashion around pulley 47 and second and third pulleys 48 and 49. Paper feed pulley 51 for transporting copying paper C is mounted on the same shaft as first pulley 47. Mounted on the same shaft as third pulley 49 is gear 53 meshing with drum gear 52 for driving photosensitive member 11. Mounted on the same shaft as second pulley 48 are first drive gear 56 meshing with second drive gear 55 on adjacent shaft 54, electromagnetic clutch CL2 and third drive gear 57. Shaft 54 supports fourth drive gear 58 movable with third drive gear 57 and the aforementioned drive pulley 32 carrying first cable 29. It will be apparent from the above arrangement that when electromagnetic clutch CL2 is energized, first and second carriages 3 and 7 will travel at speeds of v and v/2.

When desired, a copying mechanism for producing copies at varying magnifications such as disclosed in U.S. Pat. No. 3,884,574 can be used for the scanning means drive mechanism described above.

Figure 4:
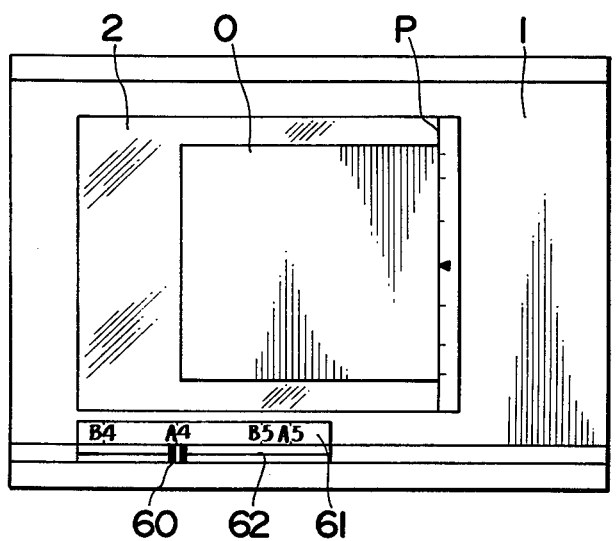
FIG. 4 is a top plan view showing the original holder of the copying apparatus of FIG. 2 for supporting the original to be copied.

With reference to FIG. 4, original holder 1 is provided with a reference edge member P to which one end of original O is to be aligned when the original is placed on transparent glass plate 2. Holder 1 also has index member 60 slidable along the original and positionable in coincidence with the other end of the original. Scale 61 extending along glass plate 2 in the sliding direction of index member 60 is provided with marks indicating the sizes of originals which are used most frequently. Index member 60 is slidable in and guided by slit 62. When index member 60 is positioned in coincidence with the end of the original, the copying paper can be cut to a length equal to the length of the original.

Figure 5:
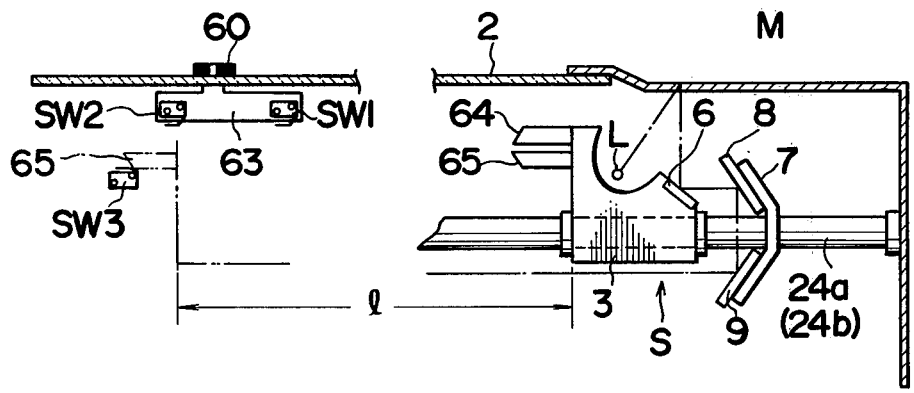
FIG. 5 shows an embodiment of the mechanism for controlling the scanning movement of scanning means included in the copying apparatus shown in FIG. 1.

As seen in FIG. 5, index member 60 is integral with switch mount 63 projecting into the path of travel of first carriage 3 and fixedly provided with cutter-operating switch SW1 and return initiating switch SW2. First carriage 3 has first switch actuating piece 64 for actuating cutter operating switch SW1 and return initiating switch SW2.

First carriage 3 is further fixedly provided with second switch actuating piece 65 for energizing return position regulating switch SW3 fixedly mounted in the interior of copying apparatus M. Switch SW3 is located in such a position that the heating of original supporting glass plate 2 by exposure lamp L can be restricted to temperatures within an allowable range as already stated. Switch SW3 is associated with return initiating switch SW2 by a circuit to be described below. The specified minimum distance of the travel of scanning system S (first carriage 3) is the distance l from the start position of the system S, shown in solid lines in FIG. 5, to the position where second switch actuating piece 65 energizes switch SW3. Thus switch SW3 regulates the return position of scanning system S so that the return movement of system S is not initiated before the distance l has been completely traversed.

Figure 6:
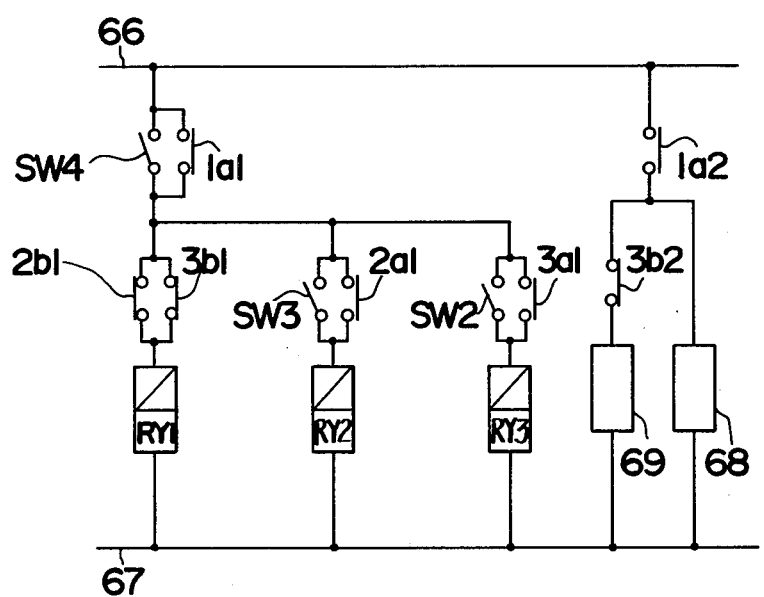
FIG. 6 illustrates an electric circuit for the control mechanism of FIG. 5.

FIG. 6 shows an example of the circuit construction including the aforementioned switches. Power supply lines 66 and 67 extend from a controlled power supply where a suitable rectified current of reduced voltage is fed from the power supply circuit (not shown) of the copying apparatus. Relay RY1 for controlling the power supply is connected to the lines 66 and 67 through the parallel circuit of start switch SW4, such as a print switch, and contact 1a1 of relay RY1 and through the parallel circuit of contacts 2b1 and 3b 1 of relays RY2 and RY3. Return initiating switch SW2 is connected in series with relay RY3 having self-maintaining contact 3a1. Return position regulating switch SW3 is connected in series with relay RY2 having self-maintaining contact 2a1. Switches SW2 and SW3 are connected to line 66 through the parallel circuit of start switch SW4 and relay contact 1a1. Relays RY2 and RY3 are connected to line 67.

Another contact 1a2 of relay RY1 serves as a power supply switch for scanning system drive circuit 68 and circuit 69 for controlling exposure, charging, erasing, etc. Contact 1a 2 is connected to circuit 69 via normally closed contact 3b2 of relay RY3.

The operation of the overall circuit described above is as follows with reference to FIG. 5, first in the case where return initiating switch SW2 is positioned closer to the start position of scanning system S than is return position regulating switch SW3 as seen in FIG. 5. When start switch SW4, such as a print switch, is closed, relay RY1 is energized through normally closed contacts 2b1 and 3b1 of relays RY2 and RY3 and is self-maintained by contact 1a1. Consequently contact 1a2 is closed, energizing circuits 68 and 69 to drive scanning system S, light exposure lamp L and operate corona discharge means 12, eraser 16, etc. Simultaneously therewith, copying paper C is transported forward. The control circuitry as well as for cutter controlling circuit, etc., are known and need not be described for the purposes of carrying out the invention.

With movement of scanning system S, namely first and second carriages 3 and 7, first switch actuating member 64 on the first carriage pushes cutter operating switch SW1, energizing solenoid SL1 through known means and operating cutter 17 to cut copying paper C to a length corresponding to that of the original. Clutch CL1 is deenergized to stop paper feed rollers 17a. The continuing travel of first carriage 3 causes first switch actuating member 64 to trip return initiating switch SW2, whereupon relay RY3 is energized by self-maintaining contact 1a1 of relay RY1 and is self-maintained by contact 3a1, with contacts 3b1 and 3b2 opened. Contact 3b2, when opened, deenergizes exposure lamp L, corona discharge means 12 and eraser 16, whereby the scanning operation is substantially completed. Relay RY1 nevertheless is held energized by contact 2b1 of relay RY2. When second switch actuating member 65 actuates return position regulating switch SW3 to energize relay RY2, contact 2b1 opens, deenergizing relay RY1 to open contacts 1a1 and 1a2 and stop scanning system S, i.e. first and second carriages 3 and 7. At this time, scanning system S is initiated into a return movement. System S can be returned by suitable means, such as retracting spring means or an additional clutch, which is operated after electromagnetic clutch CL2 shown in FIG. 3 for actuating the scanning movement has been deenergized.

When return initiating switch SW2 is positioned on the left side of return position regulating switch SW3 in FIG. 5, namely when it is more remote from the start position of scanning system S than switch SW3, the overall circuit operates in the same manner as above except that switches SW2 and SW3, namely relays RY2 and RY3, operate in a reverse order to the order previously described. Accordingly, relay RY1 is deenergized when return initiating switch SW2 is pushed to energize relay RY3. In this case, scanning system S stops simultaneously with the deenergization of exposure lamp L, etc.

Figure 7A:
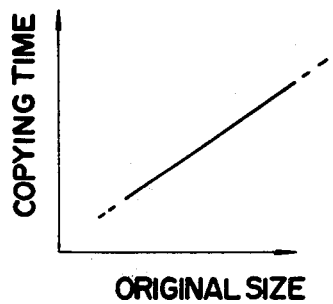
FIGS. 7A and 7B are graphs showing the relation between a conventional scanning means control mechanism and the control mechanism of the present invention.
Figure 7B:
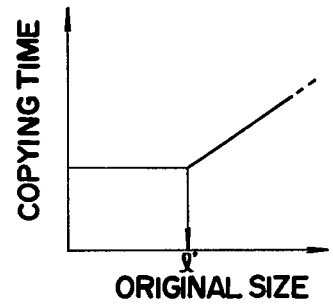

With the arrangement described, therefore, scanning system S is returned from the position corresponding to the length of the original when return initiating switch SW2 is positioned more remote from the start position of system S than return position regulating switch SW3. Whereas, if switch SW2 is positioned closer to the start position than switch SW3 for an original of reduced length, scanning system S will not be returned by the operation of switch SW2. System S is then returned with the operation of switch SW3. This will be apparent from the graphs of FIGS. 7A and 7B, in which the time required for one cycle of copying operation is plotted on the ordinate vs. the size (length) of the original plotted on the abscissa. FIG. 7A represents a conventional scanning system which is returned in corresponding relation to the size of the original. FIG. 7B represents the scanning system S shown in FIGS. 5 and 6 for which the minimum travel distance l is set. It is apparent from these Figures that for originals of smaller size than the original size l' corresponding to the distance l, the travel of system S alone is continued after the substantial completion of cutting and scanning involving exposure. In this case each copying cycle requires a constant time T irrespective of the original size. Thus, original supporting glass plate 2 can be prevented from overheating during repeated copying operation.

Figure 8:
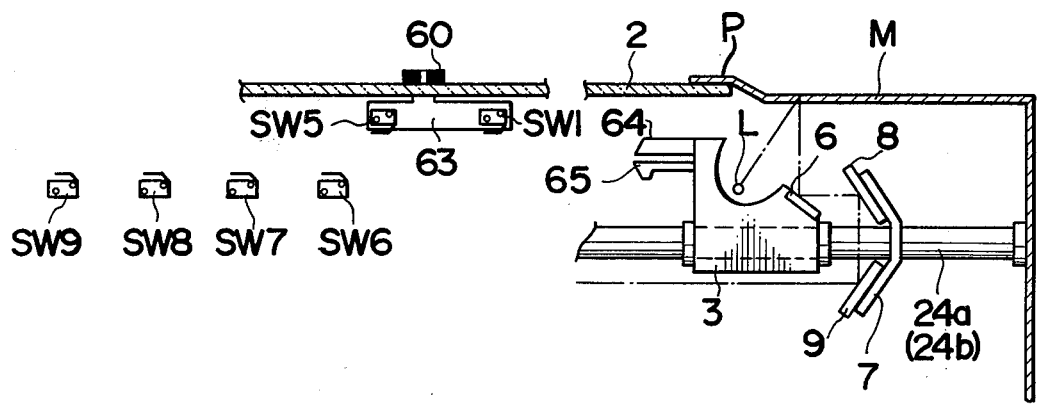
FIG. 8 is another embodiment of a control mechanism of the present invention adapted to suppress a rise in the temperature of the original supporting glass plate.
Figure 9:
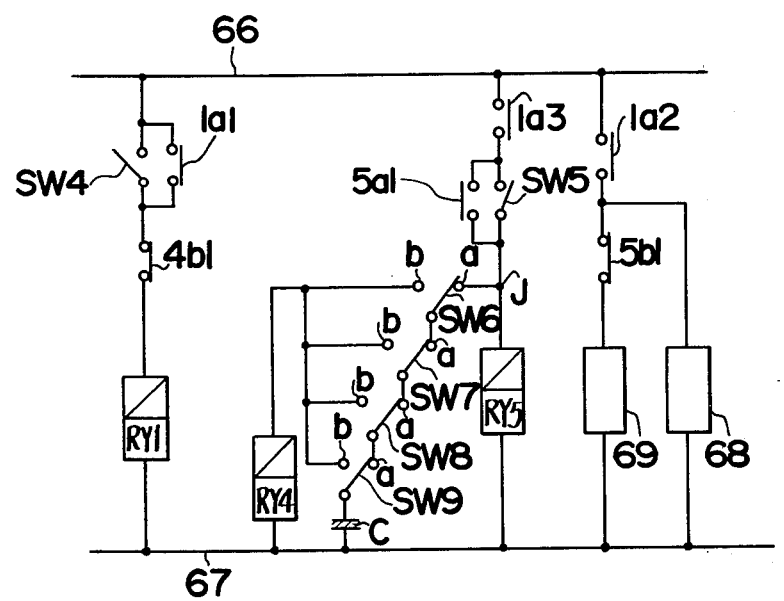
FIG. 9 shows an electric circuit for the control mechanism illustrated in FIG. 8.

FIGS. 8 and 9 show another embodiment of the invention, wherein slidable switch mount 63, integral with index member 60 carries cutter operating switch SW1 and switch SW5 for deenergizing circuit 69 for exposure, charging, etc. First switch actuating member 64 is adapted to actuate these switches. Second switch actuating member 65 actuates first to fourth return initiating switches SW6 to SW9 arranged in suitably spaced relationship. FIG. 9 shows a circuit including start switch SW4 and switches SW5 to SW9.

With reference to the circuit of FIG. 9, start switch SW4 and self-maintaining contact 1a1 of relay RY1 are connected, via normally closed contact 4b1 of relay RY4, to relay RY1. Normally open contact 1a3 of relay RY1 is connected to relay RY5 through switch SW5 for denergizing circuit 69 and self-maintaining switch 5a1 of relay RY5. Capacitor C and a series of first to fourth return initiating switches SW6 to SW9 are provided between power supply line 67 and junction J between switch SW5 and relay RY5. While each of switches SW6 to SW9 is closed at contact a, the switch group usually is out of contact with second switch actuating member 65 but is closed alternatively at contact b by being pushed by the actuating member 65. Contacts b of switches SW6 to SW9 are connected to relay RY4. Contact 1a2 of relay RY1 serves as a power supply switch for scanning system drive circuit 68 and control circuit 69 for controlling exposure, the charging and eraser means, and is connected to control circuit 69 through normally closed contact 5b1 or relay RY5.

The operation of the overall circuit described immediately above will be described with additional reference to FIG. 8. As in the previous embodiment, index member 60 is slidable along a side edge of original supporting glass plate 2. The position which is most remote from reference edge member P, and to which index member 60 is shiftable, is set at the exposure OFF position of switch SW5 when switch SW5 is located between third return initiating switch SW8 and fourth return initiating switch SW9. It is now assumed that index member 60 is so positioned that exposure OFF switch SW5 is located between first return initiating switch SW6 and second return initiating switch SW7. Therefore, when start switch SW4 is depressed, relay RY1 is energized through normally closed contact 4b1 of relay RY4 and is self-maintained by contact 1a1. Consequently, contacts 1a3 and 1a2 are closed, causing circuit 68 to initiate travel of scanning system S and energizing control circuit 69 through closed contact 5b1 of relay RY5 to operate exposure lamp L, corona discharge means 12, eraser 16, etc. With the movement of scanning system S, cutter 17 and paper feed rollers 17a are operated under the control of switch SW1 as already described. Scanning system S continues to travel, causing second switch actuating member 65 to push first return initiating switch SW6. However, since first switch actuating member 64 is still out of engagement with exposure OFF switch SW5, the circuit of FIG. 9 including first to fourth return initiating switches SW6 to SW9 remains unenergized. No return movement of scanning system S takes place, therefore, and it continues to move further forward, first switch actuating member 64 pushes exposure OFF switch SW5, whereupon relay RY5 is energized through contact 1a3 of relay RY1 and is self-maintained by contact 5a1, and contact 5b1 is opened. This deenergizes control circuit 69 for controlling the exposure means and the like. With the closing of contact 5a1, capacitor C is charged through contacts a of return initiating switches SW6 to SW9. At this time, switch SW6 is returned to contact a. Thus, second switch actuating member 65 functions to energize switches SW6 to SW9 for a very short period of time. After capacitor C has been charged, second switch actuating member 65 pushes second return initiating switch SW7, closing that switch at contact b. The charge on capacitor C therefore energizes relay RY4 and opens contact 4b1 to deenergize relay RY4. Contact 1a2 opens to stop scanning system S, which then returns as already described.

According to the embodiment shown in FIGS. 8 and 9, first and second carriages 3 and 7 are returned by the operation of that return initiating switch which is actuated subsequent to exposure OFF switch SW5. If switch SW5 and one of the return initiating switches are turned on simultaneously, capacitor C is not charged at that time, so that the next return initiating switch functions to return scanning system S.

It is apparent from the above description that with the present embodiment first return initiating switch SW6 determines the minimum distance of the travel of scanning system S. For example, when index member 60 is in the position illustrated in FIG. 8, or is positioned closer to the start position of scanning system S, the system will not be returned until first return initiating switch SW6 is actuated despite the completion of substantial scanning operation completed by the closure of exposure OFF switch SW5.

Figure 10:
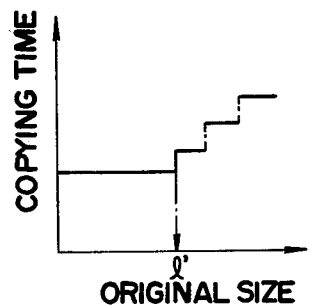
FIG. 10 is a graph showing the relation between copying time and the size of original established by the use of the control mechanism shown in FIG. 8.

FIG. 10, like FIG. 7, shows the relation between the original size and copying time established by the present embodiment. When switch SW5 is located in one of the spaces between return initiating switches SW6 to SW9, the return of scanning system S is initiated at the same corresponding position, namely at the position where switch SW7, SW8 or SW9 is actuated. When switch SW5 is located at the same position as switch SW6, or closer to the start position of system S than switch SW6, the return of system S is initiated by switch SW6 at all times. In this way, original supporting glass plate 2 is prevented from overheating.

With minimum distance l set for the travel of scanning system S, original supporting glass plate 2, heated by exposure lamp L during scanning, can be fully cooled, for the prevention of overheating, in the course of return of the scanning system even when the scanning distance movement is the smallest. This is evidenced by our experiment conducted with the use of a copying apparatus according to the above embodiment, but without using any heat insulating glass plate or cooling air applicator. In this experiment, an original of A5 size (148 mm×210 mm) was repeatedly copied with minimum travel distance l set for the length of A4 size paper (210 mm×297 mm), with the result that original supporting glass plate 2 was heated to a temperature which was about 20° C. lower than when the same original was copied with the scanning system returned over the length of A5 size paper in the conventional manner. The result achieved by the present apparatus was found to be almost equivalent to that achieved by the use of a 3- to 5-mm-thick blue glass filter. Thus the result was substantially comparable to the effect produced by heat insulating filters. For comparison, a similar experiment was conducted with the use of a conventional apparatus in which the original supporting glass plate was cooled from underneath with air by an internal fan. The reduction of the temperature achieved was about 5° C.

The minimum travel distance should be set in accordance with the material of the original supporting glass plate, the performance of the exposure lamp, etc. A shorter distance can be set for the scanning system if it is returnable at a reduced speed. The present system may be used in combination with a heat insulating glass plate or an air applicator. This ensures the advantage that a lighter or less expensive glass plate or a simpler air applicator is usable than would otherwise be needed.

The arrangement shown in FIGS. 8 and 9 is useful also for copying apparatus for which a roll of copying paper is not usable but which is adapted for use with copying sheets of more than one specified size. In this case, cutter operating switch SW1 and cutter 17 can be dispensed with.

FIGS. 11 to 20 show other embodiments of this invention, more specifically control mechanisms for returning the scanning means at a reduced speed to suppress the rise in the temperature of the original supporting glass plate.

Figure 11:
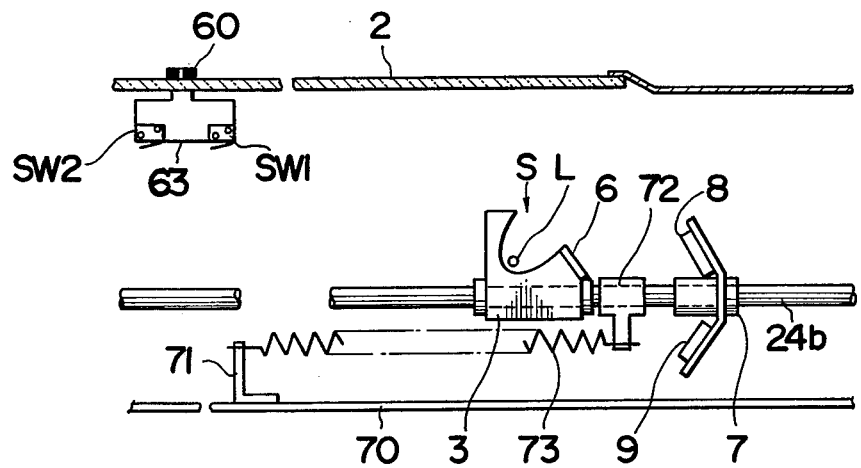
FIGS. 11 and 12 shown another copying apparatus embodying this invention, the views specifically showing a control mechanism for returning the scanning means at a reduced speed.
Figure 12:
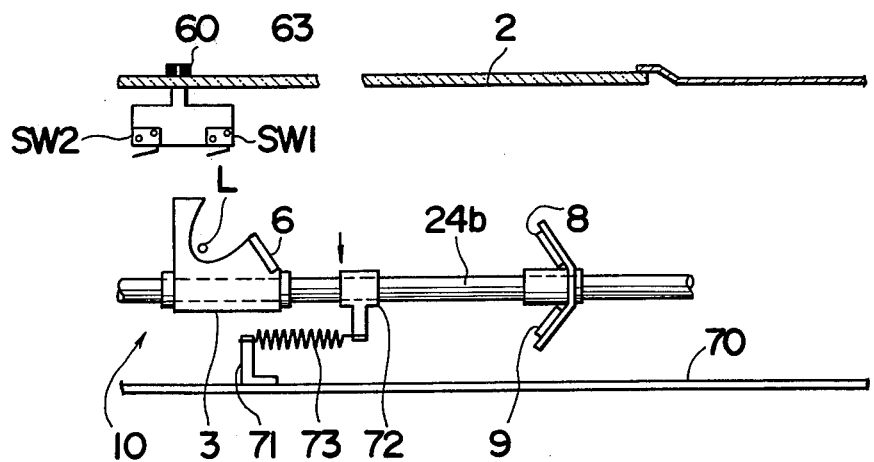

With reference to FIGS. 11 and 12 showing such a control mechanism, frame 70 extends parallel to guide rails 24a and 24b (only 24b is shown in FIGS. 11 and 12) and is fixedly provided with bracket 71 thereon. Sliding member 72 interposed between first and second carriages 3 and 7 is slidably mounted on guide rail 24b. Spring 73 extends from bracket 70 to sliding member 72 to return scanning system S at a reduced speed. Speed reduction spring 73 has a smaller spring force than return spring 44 shown in FIG. 13. Accordingly, sliding member 72, which is freely slidable on guide rails 24b, is moved to that position where the tension of spring 73 reduces to zero and stops. The stop position (see FIG. 12) corresponds to the position which first carriage 3 reaches on scanning an original of A5 size.

Switch mount 63, integral with index member 60 and slidable along a side of original holder 1, carries switch SW1 for operating cutter 17 and return initiating switch SW2 for turning off exposure lamp L and returning scanning system S. Switches SW1 and SW2 are adapted to be actuated by first switch actuating member 64 on first carriage 3.

When scanning system S is in its start position shown in FIG. 11, sliding member 72 is held pushed rightward against the tension of speed reduction spring 73 by first carriage 3 which has been returned by the restoring force of return spring 44 (FIG. 3). When the print switch is closed, exposure lamp L is turned on and first and second carriages 3, 7 are initiated into a leftward scanning movement at speeds of v and v/2, respectively. At this time, sliding member 72 is moved leftward by the tension of spring 73, and follows first carriage 3.

When the original is greater than the specified size, e.g. A5, the tension of speed reduction spring 73 reduces to zero upon scanning system S reaching the position equivalent to A5 size, bringing sliding member 72 to a halt as shown in FIG. 12, but scanning system S continues to scan, causing first switch actuating member 64 to actuate cutter operating switch SW1 upon the arrival of system S at the position corresponding to the length of the original. Cutter 17 operates to cut off a section of rolled copying paper C. Subsequently, first switch actuating member 64 actuates return initiating switch SW2, which turns off exposure lamp L and permits scanning system S to return under the action of return spring 44 shown in FIG. 3. First carriage 3 comes into contact with sliding member 72 and stops at the position equivalent to A5 size. System S returns to its start position along with sliding member 72 against the tension of spring 73. Accordingly, when scanning system S returns beyond the A5-size position, the speed of return decreases in inverse proportion to the increase in the tension of spring 73.

If the original is smaller than the specified A5 size, scanning system S starts to return before sliding member 72 reaches its stop position. Scanning system S returns against the tension of spring 73, which therefore slows down returning system S. The reduction in the return speed serves to extend the duration of the extinction of exposure lamp L at least to a predetermined time period, thus preventing the rise in the temperature of original supporting glass plate 2.

While sliding member 72 and the speed reduction spring 73 operate to reduce the heating of glass plate 2, they also function to absorb the impact involved in the return of carriages 3, 7 in the case of originals, for example, of greater than A5 size. This serves to reduce the vibration to which exposure lamp L and the other members are subjected, to provide a prolonged life to these members and make carriages 3, 7 themselves less susceptible to strain.

Although the embodiment of FIGS. 11 and 12 differs from the embodiments shown in FIGS. 5 to 10 in that the first carriage is returnable even when the image scanning distance is smaller than the specified distance, all the embodiments are alike in effectively suppressing the rise in temperature of the original supporting glass plate.

Figure 13:
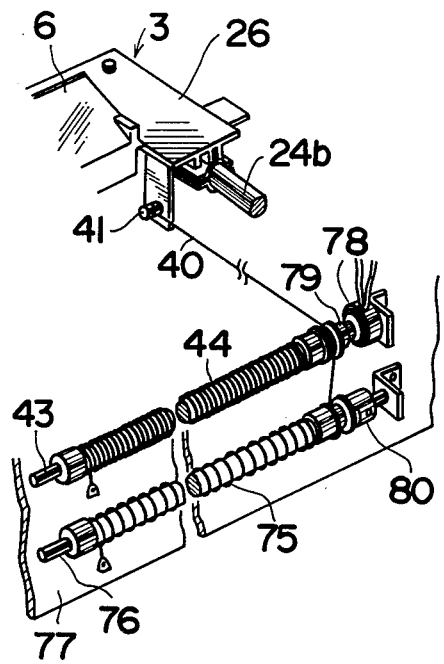
FIGS. 13 and 14 show another embodiment of the return control mechanism for the scanning means.
Figure 14:
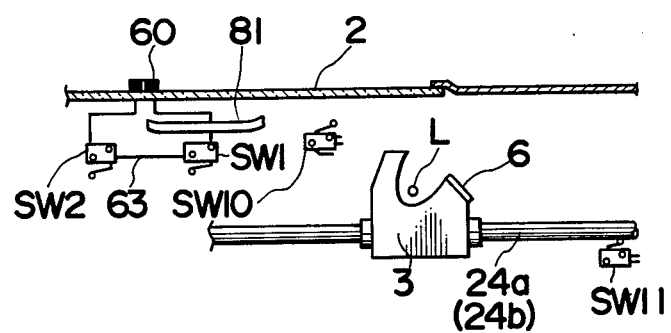

FIGS. 13 and 14 show a modification of the embodiment of FIGS. 11 and 12. In addition to the usual return spring 44 shown in FIG. 3 as wound around rod 43, second return spring 75 of smaller force is wound on rod 76, the arrangement being such that when the original is of A5 size or greater, carriages 3, 7 are returned by the two springs 44, 75, whereas if the original size is smaller than A5, weaker spring 75 alone acts to return the carriages at a reduced speed.

More specifically stated, return spring 44 has one end attached to frame 77 and the other end secured to rod 43. The other return spring 75 has one end attached to frame 77 and the other end secured to rod 76. Wire 40 has one end secured to portion 41 of slide member 26 on the first carriage, an intermediate portion wound around clutch roller 79 of clutch 78 on rod 43, and the other end wound on and secured to roller 80 fixed to rod 76.

As seen in FIG. 14, switch SW10 is provided as a means for detecting that the original is shorter than A5 size. Switch SW10 is actuated by lever 81 on switch mount 63 integral with index member 60. The output of switch SW10 is fed to clutch 68. If the switch is closed clutch 78 is disengaged, freeing clutch roller 79 from rod 43, whereas if the switch is in its OFF position, clutch 78 is engaged to render clutch roller 79 rotatable with rod 43.

In the case where index member 60 is set for the length of an original as shown in FIG. 4 and the original is smaller than A5 size, lever 81 closes switch SW10, which in turn disengages clutch 78, releasing clutch roller 79 from rod 43. Carriages 3, 7 start to scan the original in this state. With the travel of carriages 3, 7, wire 40 is paid out, rotating roller 80 and rod 76 while allowing clutch roller 79 to idly rotate, with the result that a restoring force builds up only on second return spring 75. Switch actuating member 64 on first carriage 3 actuates cutter operating switch SW1, which in turn functions to cut copying paper C. Subsequently, member 64 actuates return initiating switch SW2 to turn off exposure lamp L. At the same time, the restoring force of spring 75 returns carriages 3, 7 at a reduced speed, whereby original supporting glass plate 2 can be prevented from overheating.

When index member 60 is set for an original length which is of A5 size or greater, switch SW10 remains in its OFF position. Engagement of clutch 78 makes clutch roller 79 rotatable with rod 43. Carriages 3, 7 are thereby initiated into a scanning movement causing paid out wire 40 to rotate clutch roller 79 and rod 43 as well as roller 80 and rod 76. The return springs 44 and 75 are thereby tensioned and subsequently return the carriages 3, 7.

Figure 15:
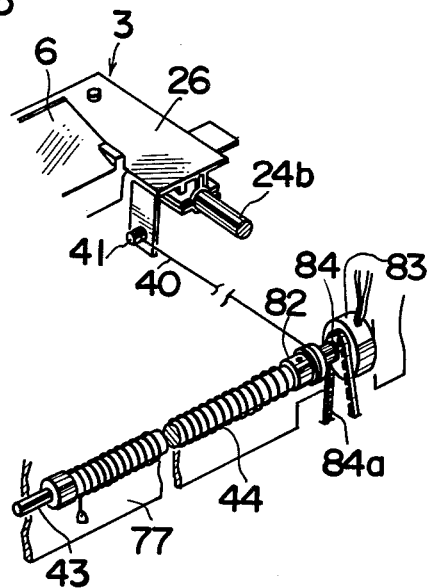
FIGS. 15 and 16 respectively show other embodiments of the return control mechanism.

FIG. 15 shows still another embodiment in which wire 40 has one end wound on and secured to roller 82 fixedly mounted on rod 43 for return spring 44. Clutch 83 mounted on rod 43 has sprocket wheel 84 which is coupled by chain 84a to a drive source (not shown). Clutch 83 is engaged when index member 60 as shown in FIG. 14 is set for the length of an original which is smaller than A5 size, switch SW10 is closed by lever 81 (FIG. 14), and further only when carriages 3, 7 are returned. With clutch 83 engaged, sprocket wheel 84 is rotatable with rod 43 so that the torque delivered through chain 84a and wire 40 returns carriages 3, 7 at the same speed as the scanning speed. The return of carriages 3, 7 to the start position is detected by switch 11 (FIG. 14). Clutch 83 is disengaged by the detection signal, freeing sprocket 84 from rod 43.

However, when index member 60 is set for an original length which is of A5 size or greater, with switch SW10 in its open position, clutch 83 is not engaged. Carriages 3, 7 are returned by the restoring force of return spring 44 accumulated thereon by the forward travel of the carriages.

First and second carriages 3, 7 are returned by chain 84a at a lower speed than by return spring 44 and require about one second for the return.

When carriages 3, 7 are forced to return by chain 84a with clutch 83 in its engaged position according to the embodiment of FIG. 15, return spring 44 retains the accumulated restoring force. While clutch 83 is engaged, return spring 44 preferably has no restoring force, but since the drive system for chain 84a actually has great torque, the restoring force of return spring 44 is negligible.

Figure 16:
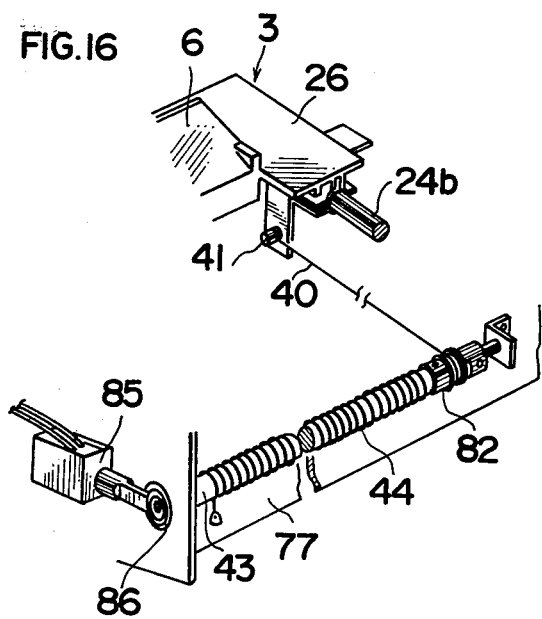

FIG. 16 shows a modification of the embodiments of FIGS. 11 to 15. As in FIG. 15, wire 40 has one end wound on and secured to roller 82 fixedly mounted on rod 43 carrying return spring 44. Rod 43 is provided at one end with brake belt 86 which is operated by the energization of solenoid 85. Solenoid 85 is energized for originals smaller than A5 size when switch SW10 (FIG. 14) is closed and only when carriages 3, 7 are returned. When solenoid 85 is energized, brake belt 86 comes into pressing contact with rod 43 and resists the restoring force of spring 44, whereby carriages 3, 7 are slowed down to return with the desired time delay. Solenoid 85, like clutch 83, is deenergized in response to a detection signal emitted from switch SW11 on the return of the carriages 3, 7 to the scanning initiating position.

Figure 17:
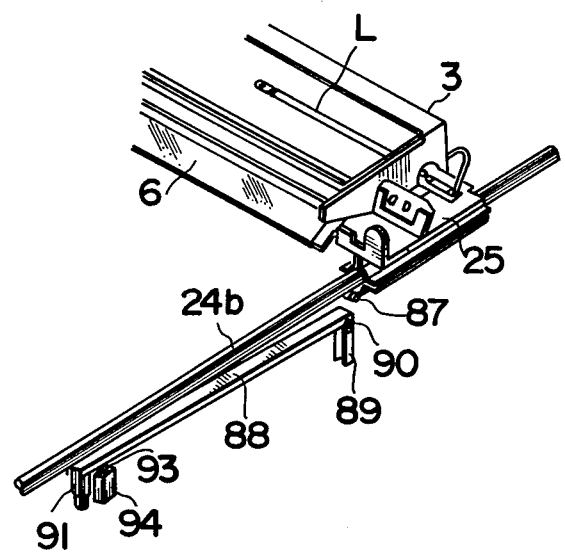
FIGS. 17 and 18 show another embodiment of the return control mechanism.
Figure 18:
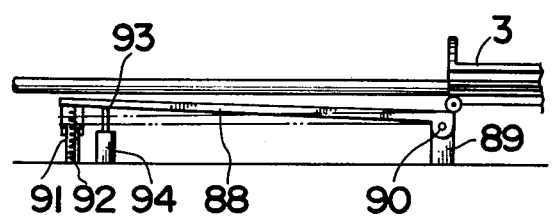

FIGS. 17 and 18 show another embodiment of the control mechanism previously described. Sliding member 25 of first carriage 3 is provided on its bottom with rotatable roller 87. Brake plate 88, disposed below guide rail 24b, is vertically pivotably supported by pin 90 on bracket 89. The free end of brake plate 88 is biased upward, i.e. toward guide rail 24b, by coiled spring 92 housed in case 91. Brake plate 88 brakes roller 87 on first carriage 3 returning on guide rail 24b, thereby slowing down carriages 3, 7 during their return. The braking force may be applied only when carriages 3, 7 return for copying originals smaller than A5 size. During the scanning movement of carriages 3, 7 and when the original to be copied is of A5 size or greater, the carriages must be relieved of the braking force. For this purpose, there is provided solenoid 94 with plunger 93 secured to the free end of brake plate 88. Solenokd 94, when energized, turns brake plate 88 downward about pin 90 to eliminate the braking action.

In the case where carriages 3, 7 are forced to return by a chain or like member coupled to an appropriate drive source in place of the force of return spring 44, the return speed can be reduced for originals smaller than A5 size by using a gear ratio which is different from that used for originals of greater sizes. Similar results are achievable by varying the number of revolutions of the drive motor.

Figure 19:
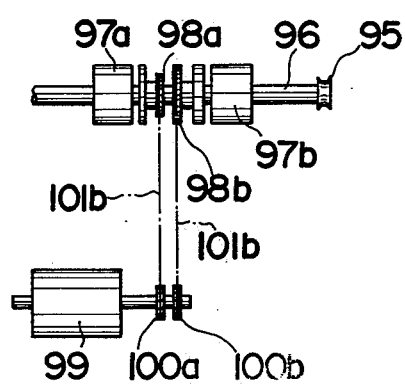
FIGS. 19 and 20 respectively show other modified embodiments of the return control mechanism.

FIG. 19 shows an arrangement of the former type in which shaft 96 of roller 95 having wire 40 passed therearound for returning carriages 3, 7 is provided with clutch 97a, 97b equipped with sprocket wheels 98a, 98b, respectively. Sprocket wheels 100a, 100b secured to the output shaft of drive motor 99 are coupled to sprocket wheels 98a, 98b by chains 101a, 101b, respectively. Sprocket wheel 98b has a greater number of teeth than wheel 98a, while sprocket wheels 100a, 100b have the same number of teeth.

For originals of A5 size or greater, clutch 97a is engaged to return carriages 3, 7 at the usual speed through sprocket wheel 98a involving a relatively small gear ratio. For originals of smaller size, clutch 97b is engaged to return carriages 3, 7 at a reduced speed through sprocket wheel 98b involving a relatively great gear ratio.

Figure 20:
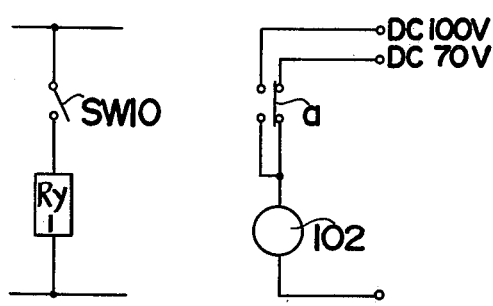

FIG. 20 shows an arrangement of the latter type including d.c. drive motor 102 for returning carriages 3, 7. Either one of two different input voltages is alternatively applicable to motor 102 through contact a of relay RY1 controllable by an original size detecting switch SW10 (see also FIG. 14) so as to return carriages 3, 7 at a reduced speed for originals smaller than A5 size.

Even when an original smaller than A5 size is continually copied, the original supporting glass plate will not be heated to a high temperature if the number of the copies is limited, for example, to ten, since exposure lamp L is held turned off during the subsequent replacement of the original with another original. Thus, when making a small number of copies continually from a short original, the scanning system can be returned at the usual speed without resorting to the speed reduction means already described.

Also, when making a single copy from each of a plurality of originals, the replacement of each original provides a sufficient time interval between the copying cycles such that the original holder is usable free of any heating problem. On the contrary, the operation of the speed reduction control mechanism would lead to a lower copying efficiency. In such an event, the present control mechanism may be held out of operation.

FIGS. 21 to 25 show other embodiments of this invention which are useful in the case where the image scanning movement distance of the scanning means is shorter than a specified distance, e.g. the length of an A5-size original, as in the case of originals of small length. The embodiments are so adapted that the exposure lamp is held turned off for a predetermined period of time, namely the scanning means is initiated into a return movement at the specified return initiating position with delayed timing after the exposure lamp has been turned off, or the scanning means which has been returned to its start position is held out of copying operation for a predetermined period of time, whereby the rise in the temperature of the original supporting glass plate is prevented.

Figure 21:
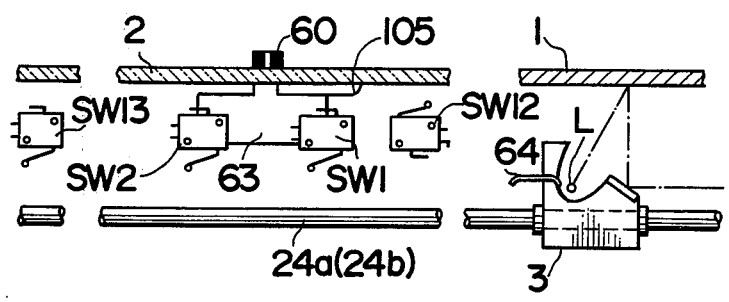
FIGS. 21 and 22 show another embodiment of control means for holding the exposure lamp turned off for a predetermined period of time.

With reference to FIG. 21, switch SW12 detects the distance of return travel of first carriage 3 when it is smaller than a specified distance of travel, namely the length of an A5 size original. Switch SW12 is actuated by switch actuating member 105 on switch mount 63 integral with index member 60 which is slidable along a glass plate on original holder 1. Switch mount 63 carries switch SW1 for actuating cutter 17 and another switch SW2 for turning off exposure lamp L. Switches SW1 and SW2 are adapted to be actuated by first switch actuating member 64 fixed to first carriage 3. As will be described later, switch SW2 functions to permit a further scanning movement of carriages 3, 7 when switch actuating member 105 is in pressing contact with switch SW12, and to return carriages 3, 7 when switch SW12 is out of contact with member 105.

Switch SW13 functions as a return actuating means for preventing abnormal temperature rises. If the original is smaller than A5 size, it is required that exposure lamp L be held turned off for at least one second. To ensure this, switch SW13 is spaced apart from exposure lamp turning off switch SW2 by such a predetermined distance that actuating member 64 on first carriage 3 actuates switch SW13 after moving forward for at least one second upon actuating switch SW2. Switch SW13, when turned on, returns carriages 3, 7.

With reference to FIG. 23, switch SW14 detects the stop (start) position of carriages 3, 7 and remains closed (to energize relay RY13) only when carriages 3, 7 are in their stop position. Switch SW14 is open during the movement of the carriages. This embodiment operates in the following manner. When initiating a copying operation, switch SW14 is held closed, with carriages 3, 7 in the stop position. Relay RY13 is energized to open contacts 13b1, 13b2 and 13b3. Print switch SW20, when depressed in this state, energizes a drive circuit through contact 11b2 of relay RY11 and a lamp circuit through contact 11b1, thus bringing lighted lamp L and carriages 3, 7 into a scanning operation.

With the movement of carriages 3, 7, switch SW14 opens, deenergizing relay RY13 and closing contacts 13b1, 13b2 and 13b3. The drive circuit and lamp circuit remain energized.

It is now assumed that index member 60 is set for an original length which is smaller than A5 size. Switch SW12 is retained in its closed position by switch actuating member 105. Carriages 3, 7 start to scan the original in this state. Switch actuating member 64 actuates switch SW1 first, operating cutter 17, which cuts rolled copying paper C to a length equal to that of the original. Subsequently, switch SW2 is closed, and relay RY11 is energized. Contacts 11b1 and 11b2 are opened, while contact 11a is closed. With contact 11a closed and contact 13b1 held closed, relay RY11 is self-maintained. Opening of contact 11b1 turns off exposure lamp L.

Despite the opening of contact 11b2, however, the drive circuit continues to operate since switch SW12 and contact 12b of relay RY12 are closed, thus permitting carriages 3, 7 to travel after exposure lamp L has been turned off. When switch actuating member 64 closes switch SW13, relay RY12 functions to open contact 12b, whereby the drive circuit is deenergized, causing return spring 44 (FIG. 3) to return carriages 3, 7. Upon completion of the return of carriages 3, 7, switch SW14 is turned on, thereby bringing relays RY11 and RY12 out of the self-maintained state.

When index member 60 is set for an original length not smaller than a specified size and switch SW12 is in its OFF state, switch SW2, when turned on by switch actuating member 64 on first carriage 3, deenergizes the lamp circuit and drive circuit. Thus, carriages 3, 7 are returned simultaneously with the extinction of exposure lamp L.

Figure 22:
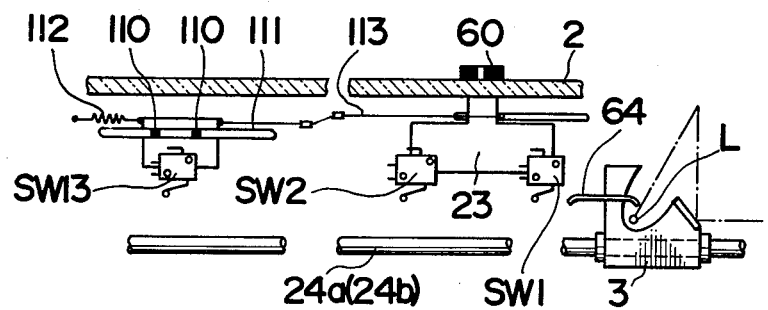

Switch SW13 may be made movable with index member 60, but for originals of A5 size or greater, the switch need not be movable since it is held out of operation. Preferably, therefore, switch SW13 may be arranged as shown in FIG. 22, wherein that switch is moved by rollers 110 and guided by elongated groove 111. The support of the switch is connected to coiled spring 112 at its one end and also to wire 113 at the other end, wire 113 being connected to index member 60. Switch SW13 is biased leftward by coiled spring 112 at all times, so that only when index member 60 is set for originals smaller than A5 size, is that switch movable therewith by being pulled by wire 113.

Switch SW13 may be replaced by a timer or like delay circuit to which a signal from switch SW2 is fed, the arrangement being such that in response to the signal from switch SW2, carriages 3, 7 are allowed to continue travelling after exposure lamp L has been turned off, for a period of time (one second) set by the delay circuit so as to be returned subsequently.

Each of FIGS. 24A and 24B schematically shows an operational sequence of the circuit of FIG. 23. Switches SW12, SW2 and SW13 function in the order illustrated.

The concept of this invention for preventing the original holder from overheating can be also employed by the control circuit shown in FIG. 22. When switch SW12 is in its OFF state for an original smaller than A5 size, relay RY2 remains unenergized, with the result that a signal for turning on exposure lamp L is applied to a delay circuit first instead of being fed directly to a drive circuit, and is thereafter applied to the drive circuit upon the lapse of a predetermined period of time. The delay time must be at least one second as will be apparent from the foregoing description. The signal for energizing the delay circuit is a continual copying signal. Conversely, if switch SW12 is in its ON state for an original of A5 size or greater, the relay remains energized, permitting the copying signal to be fed directly to the drive circuit.

Accordingly, only in the case of originals smaller than A5 size, exposure lamp L remains turned off and stationary for a specified period of time (at least one second) after completing a copying cycle and before initiation of the following copying cycle. Subsequently, upon the application of a signal from the delay circuit to the drive circuit, carriages 3, 7 start to move for the following copying cycle. The carriages 3, 7 may be held in the start position with exposure lamp L turned off after returning to that position. Alternatively, carriages 3, 7 may be halted simultaneously with the extinction of exposure lamp L after moving the desired distance corresponding to the length of the original, then held stationary for the specified time period set on the delay circuit, and thereafter returned.

Even when an original smaller than A5 size is continually copied, the original supporting glass plate will not be heated to a high temperature if the number of the copies is limited, for example, to ten, since exposure lamp L will be held turned off during the subsequent replacement of the original with another original. Thus, when making a small number of copies continually from a short original, relay RY2 can be held out of operation (to keep the delay circuit unenergized), permitting carriages 3, 7 to scan and return in the usual manner.

Although this invention has been described above with reference to copying apparatus of the electrostatic latent image transfer type including reciprocatingly movable scanning means, the invention is in no way limited to the embodiments given above but is similarly useful for those applications in which the original holder is movable, as well as apparatus of the so-called FAX type and the powder image transfer type.

Having described the invention in connection with specific embodiments thereof, it is to be understood that further modifications may now suggest themselves to those skilled in the art and such modifications are intended to be included within the scope of the appended claims.

What is claimed is:

1. In a slit exposure type copying apparatus in which an original to be copied is successively exposed by an exposure lamp means through a transparent member over which the original is placed, apparatus comprising:
    scanning means for scanning the original with said exposure lamp means successively exposing the original;
    means for varying the travel distance of said scanning means to enable an increase in the copying speed for producing a plurality of copies of the same original for shorter length originals than a specified length of original; and
    means for restricting the number of exposure illuminations by said exposure lamp means per given unit of time for said shorter length originals to prevent abnormal rise of temperature of the transparent member.

2. In a slit exposure type copying apparatus in which an original to be copied is successively exposed by an exposure lamp means through a transparent glass over which the original is placed, apparatus comprising:
    reciprocatingly movable scanning means for scanning the original with the movement thereof in one direction as said exposure lamp means successively exposes the original;
    means for returning said scanning means to an initial position;
    means defining a minimum distance of travel for said scanning means;
    means for moving said scanning means a distance equal to the actual distance required to scan the original provided said distance is at least equal to said minimum distance of travel for said scanning means regardless of the length of the original; and said scanning means returning to said initial position in response to said returning means upon travel of said minimum distance even if the actual distance required to scan the original is less than said minimum distance.

3. In a slit exposure type copying apparatus in which an original to be copied is successively exposed by an exposure lamp means through a transparent glass over which the original is placed, apparatus comprising:
  means for indexing the length of original;
  reciprocatingly movable means for scanning the original with the movement thereof in one direction from an initial position;
  means for returning said scanning means to said initial position;
  means responsive to said indexing means for deenergizing said exposure lamp means during the movement of said scanning means;
  means defining a minimum distance of travel for said scanning means;
  means for moving said scanning means a distance equal to the actual distance required to scan the original, said distance being at least equal to the minimum distance of travel for said scanning means; and
  said moving means moving said scanning means with said exposure lamp means exposing the original to scan the same, and deenergizing said exposure lamp means upon detection of said means responsive to said indexing means by said scanning means whereby said transparent glass is prevented from over-heating in continuous copying.

4. In a slit exposure type copying apparatus which comprises:
  an original supporting means including a transparent glass over which an original to be copied is placed;
  an exposure lamp means for successively exposing the original through said transparent glass;
  reciprocatingly movable scanning means for scanning the original with the movement thereof in one direction from an initial position;
  means for forming an electrostatic latent image on a photosensitive member;
  means for indexing the length of original;
  detector means including a first detection means disposed in the path of movement of said scanning means and actuatable thereby to deenergize said exposure lamp means, said exposure lamp means being deenergized when said scanning means has travelled a distance substantially equal to that distance required to scan the original;
  means defining a minimum distance of travel for said scanning means and including a second detection means disposed in the path of movement of said scanning means and actuatable thereby to return said scanning means to its initial position;
  means for moving said scanning means a distance at least as long as the actual distance required to scan the original provided said distance required to scan the original is at least equal to said minimum distance of travel for said scanning means; and
  said moving means causing said scanning means to move until the actuation of said second detection means when said first detection means is actuated prior thereto, and to continue movement of said scanning means when said second detection means is actuated prior to said first detection means.

5. The copying apparatus as in claim 4, wherein said indexing means includes an index slidable along the original for alignment witn one end thereof and said first detection means being provided integrally with said indexing means.

6. Copying apparatus as in claim 5 further comprising an electrical power source, means for energizing said exposure lamp means, means for driving said scanning means, and means for connecting said electrical power source to said means for energizing and said means for driving upon actuation of said copying apparatus;
  said first and second detection means are respective first and second switches, whereby actuation of said first switch disconnects said electrical power source from said means for energizing and actuation of said second switch disconnects said electrical power source from said means for driving.

7. Copying apparatus as in claim 6 further comprising a start switch and wherein said means for connecting said electrical power source includes first, second and third relays, said first relay including a first normally open contact, said second relay including a first normally closed contact and said third relay including a second normally closed contact, said first normally closed contact interconnecting said means for energizing with said first normally open contact, said first normally open contact interconnecting said electrical power source with said first normally closed contact and said means for driving, said start switch and said second normally closed contact being serially interconnected between said electrical power source and said first relay, whereby actuation of said start switch energizes said first relay closing said first normally open contact to connect said electrical power source to said means for energizing and said means for driving;
  said first and second switches being connected to said power source through said start switch, said first and second switches being respectively connected in series with said second and third relays, whereby closure of said first switch energizes said second relay to open said first normally closed contact thereby disconnecting said means for energizing from said power source, and closure of said second switch energizes said third relay to open said second normally closed contact to disconnect said first relay from said power source and open said first normally open contact.

8. Copying apparatus as in claim 7 wherein said first, second and third relays each include self-maintaining contacts respectively connected in parallel with said start switch and said first and second switches.

9. The copying apparatus as in claims 4 or 5, wherein said second detection means includes a plurality of switch means spaced apart from one another in the direction of movement of said scanning means, and the first of said switch means defining said minimum distance, and the other of said switch means actuating said defining means to return said scanning means when required to move respectively longer distances than said minimum distance.

10. Copying apparatus as in claim 9 wherein said first detection means is a first switch and said plurality of switch means each include a contact movable between first and second contact positions, the movable contacts each being normally at said first contact position such that said movable contacts are in series connection and connected to said first switch, means for storing an electrical signal and connected to at least one of said movable contacts, an electrical power source, means for energizing said exposure lamp means, means for driving said scanning means and means for connecting said electrical power source to said means for energizing, said means for driving and first switch upon actuation of said copying apparatus, whereby actuation of said first switch means causes said means for storing to be charged and disconnects said means for energizing from said power source, and actuation of any of said plurality of switch means from said first position to said second position connects said means for storing to said means for connecting to disconnect said means for driving from said power source.

11. Copying apparatus as in claim 10 further comprising a start switch for starting said copying apparatus and wherein said means for connecting and disconnecting includes first, second, and third relays, said first relay being connected to said power source through said start switch and including first and second normally open contacts, said second relay being connected to said power source through said second normally open contact and said first switch and including a third normally closed contact interconnecting said means for energizing to said power source through said first normally open contact, said first normally open contact connecting said power source to said means for driving, said third relay including a fourth normally closed contact interconnected between said start switch and said first relay, whereby closure of said first switch actuates said second relay to open said third normally closed contact, movement of any of said movable contacts to said second position from said first position subsequent to the closing of said first switch actuates said third relay by said stored electrical signal to open said fourth contact to deactuate said first relay and open said first and second contacts.

12. Copying apparatus as in claim 11 wherein each of said first and second relays include self-maintaining contacts connected respectively in parallel with said starting switch and said first switch.

* * * * *